United States Patent [19]

Watanabe

[11] Patent Number: 4,744,515

[45] Date of Patent: May 17, 1988

[54] AUTOMATIC WATER-SPRINKLING CONTROLLER

[75] Inventor: Junichi Watanabe, Kusatsu, Japan

[73] Assignee: Konan Seiko Co., Ltd., Japan

[21] Appl. No.: 930,983

[22] Filed: Nov. 13, 1986

Related U.S. Application Data

[63] Continuation of Ser. No. 658,381, Oct. 5, 1984, abandoned.

[30] Foreign Application Priority Data

Nov. 2, 1983 [JP] Japan .................................. 58-206631

[51] Int. Cl.$^4$ .............................................. A01G 27/00
[52] U.S. Cl. ...................................... 239/70; 137/78.3; 239/64
[58] Field of Search ..................... 239/63–65, 239/70, DIG. 15, 67–68; 137/78.1, 78.2, 78.3

[56] References Cited

U.S. PATENT DOCUMENTS

| | | | |
|---|---|---|---|
| 2,577,337 | 12/1951 | Lancaster | 137/78.2 |
| 2,612,901 | 10/1952 | Milano | 137/78.2 |
| 2,674,490 | 4/1954 | Richards | 239/64 |
| 3,024,372 | 3/1962 | Seele | 239/63 |
| 3,339,842 | 9/1957 | Hoeppel | 239/63 |
| 3,991,939 | 11/1976 | Maclay | 239/63 |
| 4,055,200 | 10/1977 | Lohoff | 239/63 |
| 4,214,701 | 7/1980 | Beckman | 239/63 |
| 4,396,149 | 8/1983 | Hirsch | 239/63 |

Primary Examiner—Andres Kashnikow
Assistant Examiner—Michael J. Forman
Attorney, Agent, or Firm—Darby & Darby

[57] ABSTRACT

An automatic water-sprinkling controller, with a peculiar main-valve connected with water supply, for controlling a water-sprinkling system which includes sprinklers, hose or pipes connected between said main-valve and said sprinklers, and a pilot tube for operating said main-valve. In the automatic controller, when the shortage of water of the ground is sensed by a moisture sensor comprising a ribbon which expands and contracts as a humidity, a microswitch is turned on by the contraction of the ribbon to feed an instant electric current for a electronic circuit and to start a timer circuit. The electric current is instantly fed to a solenoid, which is mounted in a microvalve unit, to open this unit, through the electronic circuit. When the microvalve is opened, a pilot water in the pilot tube, which is connected between the microvalve and the main-valve, starts to flow, and the main-valve is opened. These open states are held for a predetermined time period so that the sprinkler of the system can automatically perform its water-sprinkling operation for that time period.

3 Claims, 3 Drawing Sheets

FIG. 4
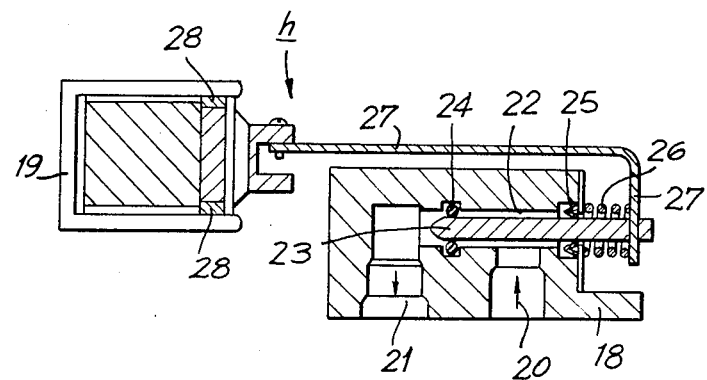
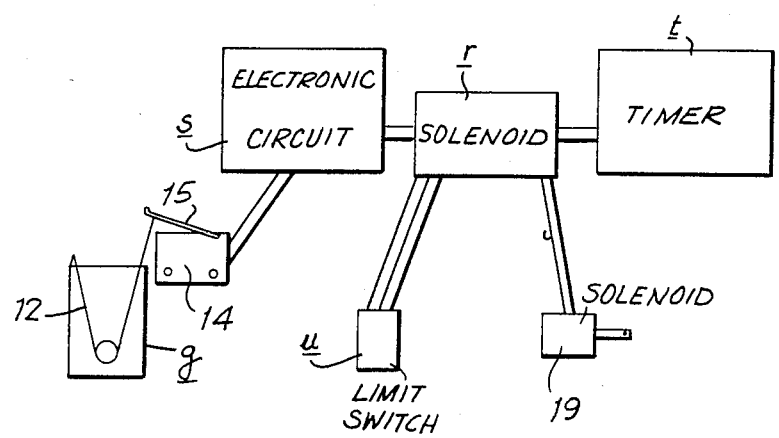
FIG. 5

AUTOMATIC WATER-SPRINKLING CONTROLLER

This is a continuation of application Ser. No. 658,381, filed Oct. 5, 1984, now abandoned.

BACKGROUND OF THE INVENTION

1. Field of the Invention

The present invention relates to a water-sprinkling system for sprinkling water over lawn, moss or other crops and, more particularly, to an automatic water-sprinkling controller for controlling the water-sprinkling system so that the latter may automatically sprinkle the water for a predetermined time period when the shortage of water of the ground is sensed by the automatically water-sprinkling controller.

2. Description of the Prior Art

In the prior art, lawn, moss and so on are liable to wither, when the ground becomes short of water, so that they have to be watered many times a day, particularly in summer. This invites many disadvantges such as that the family cannot leave home for a trouble.

In recent years, there is available as means for eliminating those disadvantages an electromagnetic valve type water-sprinkling system which is equipped with a 24 hour timer. This system is acceptable as a convenience because it can be set with the water-sprinkling time period of 15 minutes, for example. However, the system has a drawback that it operates independently of the dryness of the ground, for example, it sprinkles the water even if it rains. Moreover, the system can hardly be used outdoor because its power supply uses an A.C. power source and has a problem in safety because its sprinkling operation is controlled by the A.C. power source.

SUMMARY OF THE INVENTION

It is, therefore, an object of the present invention to provide an automatic water-sprinkling controller for sensing the shortage of water of the ground to enable a water-sprinkling system to automatically perform its water-sprinkling operation for a set time period.

Another object of the present invention is to provide an automatic water-sprinkling controller which uses not an electromagnetic valve and an A.C. power source but a dry cell or a solar cell so that it can enjoy sufficient safety.

Still another object of the present invention is to provide an automatic water-sprinkling controller which consumes remarkably little electric power to elongate the life of the dry cell so that it can ensure the automatic water-sprinkling operation for a long time period.

According to a major feature of the present invention, there is provided an automatic water-sprinkling controller, with a peculiar main-valve connected with water supply for allowing water to flow therethrough when it is opened, for controlling a water-sprinkling system including sprinklers for sprinkling water when it is supplied with water, hose or pipes connected between said main-valve and said sprinklers for providing water communication inbetween, and a pilot tube for operating said main-valve with a fine pilot water therethrough, comprising: a microvalve unit communicating with said pilot tube for operating said main-valve with said fine pilot water flow which is flowed and stopped by this microvalve; a moisture sensor for sensing the shortage of water of the ground to turn a microswitch on; a microswitch for feeding an instant electric current to open said microvalve unit and for starting a timer circuit, when it is turned on by said moisture sensor; means made responsive to said instant electric current for opening said microvalve unit; a small spray nozzle communicating with said microvalve unit for spraying a portion of said pilot water to said moisture sensor to wet the same; and a timer circuit made responsive to said microswitch for holding said microvalve unit open for a predetermined time period so that said sprinkler can automatically sprinkle the water for said predetermined time period when the ground becomes short of moisture.

According to the more specific feature of the present invention, when the shortage of water of the ground is sensed by a moisture sensor comprising a ribbon which expands and contracts according to a humidity, a microswitch is turned on by the contraction of the ribbon to feed an instant electric current for an electronic circuit and to start a timer circuit. The electric current is instantly fed to a solenoid, which is mounted in a microvalve unit, to open this unit through the electronic circuit. When the microvalve is opened, a pilot water in the pilot tube, which is connected between the main-valve and the microvalve, starts to flow, and the main-valve is opened. These open states are held for the predetermined time period so that the sprinkler can automatically perform its water-sprinkling operation for that time period.

BRIEF DESCRIPTION OF THE DRAWING

Other objects, features and advantages of the present invention will be described in the following with reference to accompanying drawings, in which:

FIG. 4 is an enlarged schematic section showing one embodiment of the microvalve unit to be used in the present invention; and FIG. 5 is a block diagram showing the electronic circuit to be used with the automatic water-sprinkling controller of the present invention.

DESCRIPTION OF THE PREFERED EMBODIMENT

The present invention will now be dscribed with reference to the accompanying drawings.

Figure 1:
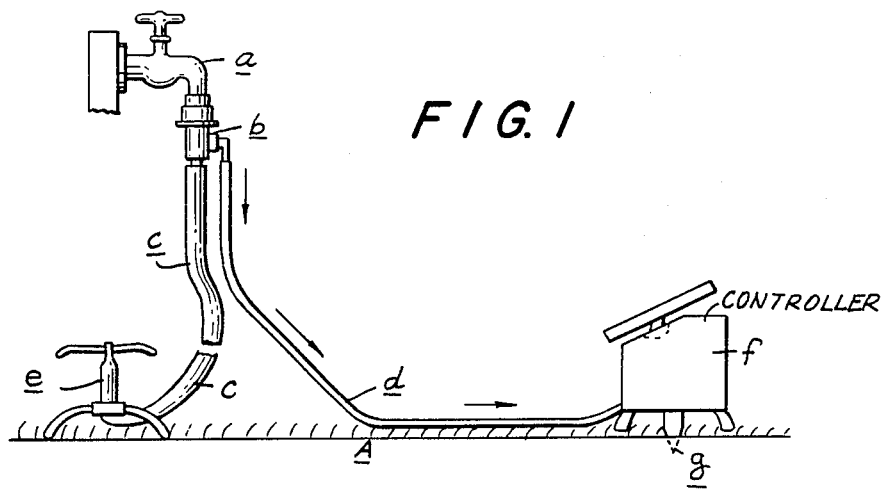
FIG. 1 is a schematic view for explaining the automatic water-sprinkling controller according to the present invention.

FIG. 1 is a schematic view for explaining the automatic water-sprinkling controller according to the present invention.

To a faucet a of the water supply, as shown in FIG. 1, there is attached a main-valve b, to which are connected a main hose c and a pilot tube d. A sprinkler e is connected as a water sprinkling device to the leading end of the main hose c whereas a controller f is connected to the leading end of the pilot tube d.

Both the sprinkler e and the controller f are placed on such a ground A planted with lawn, for example, as requires watering.

From the bottom of that controller f, there protrudes down a moisture sensor unit g which has its lower end contacting with or being burried in the ground A. When the moisture sensor senses the decrease of the humidity of the air surrounding the moisture sensor unit g as the ground A becomes dry, a pilot water starts to flow through the pilot tube d by a later described action to open the main valve b thereby to allow the water to flow through the main hose c so that the water coming from the water supply is sprinkled by the action of the sprinkler e. The time period of this water-sprinkling operation can be freely set by a timer circuit which is mounted in the controller f. In other words, the water is enabled to flow through the pilot tube d for a desired time period. At the same time, incidentally, the frequency of the water-sprinkling operation can also be changed by adjusting the sensitivity of the moisture sensor, as will be described hereinafter.

This mechanism that the main-valve b is opened and closed in dependence upon whether or not the pilot water flows through the pilot tube d will use as following, for example.

Figure 2:
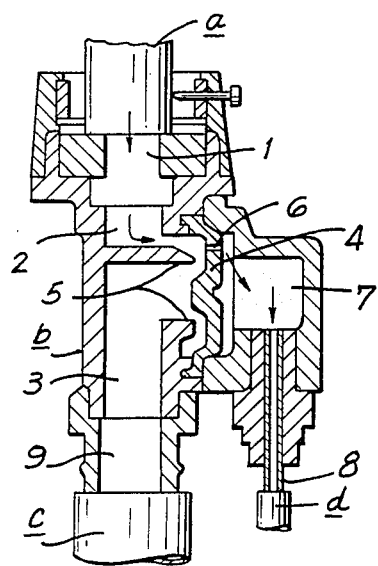
FIG. 2 is a sectional view showing one embodiment of the main-valve to be used with the controller of the present invention.

FIG. 2 is a sectional view showing the detail of one embodiment of the main-valve to be used with the controller f of the present invention.

The main-valve b attached to the faucet a in the manner shown in FIG. 2 is formed with an attachment port 1 and an inlet chamber 2 which has communication with the former and which is separated from an outlet chamber 3 by means of a diaphgram valve 4. In short, the watercourse between the inlet and outlet chamber 2 and 3 is opened and closed as the diaphragm valve 4 is brought out of and into contact with a valve seat 5.

Moreover, at the back of that diaphgram valve 4, namely, at a position to have communication with a small hole 6 formed in the diaphragm valve 4, there is formed a back chamber 7 from which leads out a pilot connecting port 8. The aforementiond pilot tube d is connected to the pilot connecting port 8. Into the outlet chamber 3, on the other hand, there protrudes a main connecting port 9 to which the aforementioned main hose c is connected.

When the pilot water flow is developed in the pilot tube d, the water pressure in the backchamber 7 drops so that the diaphragm valve 4 is brought from the valve seat 5 by the water pressure coming from the inlet chamber 2 to allow the water to flow to the outlet chamber 3 thereby to open the main-valve b. When the pilot water flow in the pilot tube d is stopped, on the contrary, the water pressure in the back chamber 7 rises so that an equal water pressure prevails in the inlet chamber 2 and the back chamber 7 because of the small hole 6, but the water pressure in the outlet chamber 3 drops so that the diaphragm valve 4 is forced to contact with the valve seat 5 by the action of the pressure coming from the backchamber 7 thereby to shut off the main-valve b.

In these ways, the main-valve b is opened and closed in dependence upon whether or not the pilot water-flows through the pilot tube d so that the water-sprinkling operation of the sprinkler e is controlled.

It is one of th features of the present invention that the main-valve b is not of electromagnetic type but is suitable for safety.

Means for controlling the pilot water flow in the aforementioned pilot tube d will be described in the following.

Figure 3:
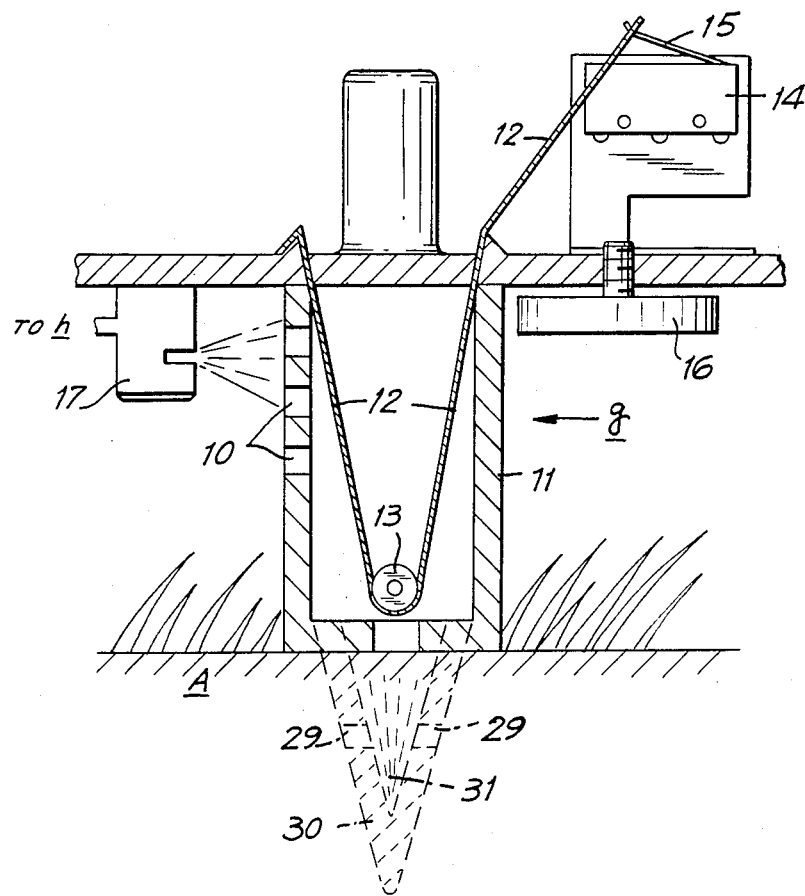
FIG. 3 is a schematic and enlarged side section showing the structure of one embodiment of the moisture sensor unit to be used in the present invention.

FIG. 3 is a schematic and enlarged side section showing the structure of one embodiment of the moisture sensor unit g to be used in the present invention.

As better seen from FIG. 3, the moisture sensor unit g is covered with a cover box 11, which has some vents 10 and has its lower end contacting with the ground A. A nylon-ribbon 12, for example, is set in the cover box 11. An end of the nylon-ribbon 12 is fixed to the upper part of the cover box 11, the center part of it is guided near the ground A by a roll 13, and the other end is fastened to an actuator 15 which is a part of microswitch 14.

Moreover, as shown with a broken line in FIG. 3, it takes a more effective results that a pointed end 30 attached under the cover box 11, with pores 29 for absorbing water, is buried in the ground A, in which a water-absorptive material 31 is in to absorb the water and to make the nylon-ribbon 12 more sensitive to the water of the ground A.

According to aforementioned way, when the humidity in the moisture sensor unit g comes to low degree as the decrease of the moisture and vapor provided from the ground for its coming to dry, the nylon-ribbon 12 in this unit comes dry and contracts to bring the actuator 15 of the microswitch 14 down, so that the microswitch 14 is turned on. In other words, for setting the nylon-ribbon 12 near the ground A, it senses not only the humidity of the air but also the moisture and vapor provided from the ground A, and, as a result, the moisture sensor works as stated above with sensing the shortage of water of the ground.

When the microswitch 14 is turned on, an electric current is fed to make a microvalve open with later described action.

By using a sensitivity adjusting knob 16, as shown in FIG. 3, the tension of the nylon-ribbon 12 is adjusted so that the microswitch 14 is turned on when the humidity in the moisture sensor unit drops to required degree. Namely, the frequency of the water-sprinkling operation is able to bechanged at will.

In the present invention, the moisture sensor works only to turn the microswitch 14 on as aforementioned, so that the electric current is instantly fed to an electronic circuit to open the microvalve. After the water-sprinkling operation starting, a timer circuit holds the open state of both valves, the microvalve and the main-valve b, for the predetermined time period, so that the water-sprinkling operation is performed for that time period.

Therefore, however the microswitch 14 is turned off with the expansion of the nylon-ribbon 12 wetted by this water-sprinkling operation, this operation is not stopped for the predetermined time period with an independent work of the timer circuit.

When the nylon-ribbon 12 is not wetted well with the water-sprinkling operation, there is a possibility that the moisture sensor fails to sense the dry stage too early. So that it is so effective that a small spray nozzle 17 is equipped in front of the moisture sensor unit g, as shown in FIG. 3, to give a water spray for the nylon-ribbon 12 to wet it sufficiently.

Water from pilot tube d which flows through the micro valve h is supplied to nozzle 17 for 5 to 10 seconds spray, which is supplied from the microvalve h as the released and made as a spray by the small spray nozzle 17. The nylon ribbon 12 is wetted by the water spray from nozzle 17 so that the ribbon 17 expands its former state after the microswitch 14 is turned on. It prevent too early sensing for the dry stage by the moisture sensor to start the next water-sprinkling operation that the small spray nozzle 17 gives a water spray for the nylon-ribbon 12 while the sprinkler e performed its water-sprinkling operation for the predetermined time period.

At the same time, the water spray keeps the nylon-ribbon 12 clean, and it facilitates to control the state of water of the ground surrounding the moisture sensor unit g equal to the one of water-sprinkled area by the sprinkler e.

Any materials, which expands and contracts responsively to the increase amd decrease of the humidity, is used as a ribbon for moisture sensor. The nylon-ribbon takes the most effective result in a variety of experiments conducted by the inventor, however, material to be used for the moisture sensor is not restricted to only the nylon-ribbon.

FIG. 4 is an enlarged schematic section showing one embodiment of the microvalve unit to be used in the present invention.

As shown, the microvalve unit h is constructed in combination of a microvalve 18 and a latching solenoid 19 and is mounted in the controller f of FIG. 1.

The pilot water coming from the pilot tube d of FIG. 1 is made to flow from an inlet port 20 to an outlet port 21 of the microvalve 18. Into an intermediate water passage 22 between those inlet and outlet ports 20 and 21, there is fitted plunger 23 which is adapted to go and to return between an O-ring 24 and a U-packing 25 thereby to open and to close that microvalve 18. The plunger 23 is urged by the expandiing force of a coil spring 26 at all times to come out of engagement with the O-ring 24. On the other hand, while an actuating lever 27 connecting the plunger 23 and the aforementioned solenoid 19 is being attracted by this solenoid 19, the spring 26 is held in its compressed states to keep the microvalve 18 in its closed state. When the electric current having been developed as a result that the aforementioned moisture sensor senses the shortage of moisture is fed to that latching solenoid 19 through a latching relay as later described, an inverse electromagnetic force for instantly overcoming the magnetic force of parmanent magnet 28 built in the solenoid 19 is generated in this solenoid 19 to instantly minimize the magnetic force having attracted the aforementioned actuating lever 27 so that the expanding force of the spring 26 dominates to disengage the plunger 23 from the O-ring 24 thereby to open the microvalve 18. Then, the water is released from the outlet port 21, when the microvalve 18 is opened, and is fed to the aforementioned small spray nozzle 17 to wet aforementioned nylon-ribbon of the moisture sensor unit g, as has been described hereinbefore.

Besides, the timer circuit, which starts its work when the microswitch 14 is turned on, independently holds the open state of the valves to allow the sprinkler e to sprinkle water for predetermined time period, in spite of the microswitch 14 being turned off with an expansion of the ribbon of the moisture sensor unit g when it is wetted. More specifically the plunger 23 is not returned against the expanding force of the spring 26 for the predetermined time period because the magnetically attracting portion of the latching solenoid 19 is positioned apart from the permanent magnet 28. After elapse of the predetermined time period, moreover, the timer circuit operates to supply the aforementioned solenoid 19 with the backward power thereby to generate an inverse electromagnetic power to that of the instant when the microvalve 18 is closed. That inverse electromagntic force attracts the actuating lever 27 against the expanding force of the spring 26 to force the plunger 23 into the O-ring 24 so that the microvalve 18 is shut off.

The electric power required to open and close the microvalve unit h thus far described is limited to one for instantly energizing the.latching solenoid 19 but is not one for energizing the solenoid for the predetermined time period of the water-sprinkling operation. Therefore the power consumption is so remarkably low as to spare the energy required. The power source can resort to a dry cell or a solar cell, and in the former case the battery replacement may take place once 6 to 12 months, which constitute one of the major feature of the present invention.

FIG. 5 is a block diagram showing the electric circuit of the controller of the present invention.

As shown in FIG. 5, when the microswitch is turned on by the contraction of the ribbon 12 of the moisture sensor unit g with sensing the shortage of water, an electric current is fed to an electronic circuit instantly. The electric current operates a latching relay r to drive the latching solenoid 19, so that the microvalve 18 is opened to effect the water-sprinkling operation, as has been described hereinbefore. Simultaneously, a timer circuit t is energized to hold the open state of the valves for predetermined time period (e.g., 5 to 20 minutes).

After lapse of the predetermined time period, the inverse electric current is fed from the timer circuit t to the latching solenoid 19 thereby to instantly generate such an electromagnetic force in that solenoid 19 as to attract the actuating lever 27 so that the microvalve 18 is closed by the actions of the plunger 23 and the O-ring 24 thereof. In this instance, the fact that the timer circuit t actuates the latching relay r to close the microvalve is confirmed by the limit switch u to prepare the microvalve to function again.

The power source for the electronic circuit of the present invention can be exemplified by either a series connection of four dry cells of 1.5 volts or a solar cell which is used with a Nickel-Cadium batter being charged thereby. The experimental results of the electronic circuit of the present invention revealed that the load current is several tens microamperes at the least and five amperes (instantly) at the most, for example. According to the experiments, moreover, the water-sprinkling system was enabled by the automatic water-sprinkling controller to enjoy the performance that it could be continuously set and that it could water five times a day in fine weather (at 20° C. with a breeze) when it was installed on lawn.

In case manganese dry cells of high performance were used, on the other hand, the life of the power source was calculated to continue for about six months if the power source was used five times a day, and was revealed to extend to 8 to 12 months if rainy or cloudy weathers were taken into consideration.

Naturally, a proper frequency and a proper time period are arranged in accordance with a circumstance (e.g., the solar, the atmospheric temperature and humidity, or the kinds of the plants, and so on) of the use site, by operating a sensitivity adjusting knob which does not appear in the drawings.

As has been described in detail hereinbefore, the present invention provides an automatic water-sprinkling controller for controlling water-sprinkling system such that the later may automatically sprinkle water in accordance with the dry state of the ground. The mainvalve is opened and closed in dependance upon whether or not the microvalve is opened, which controls the water-sprinkling operation when it is opened for such an arbitrarily set by the coactions of the moisture sensor, the electronic circuit, and the timer circuit. since the controller effects the water-sprinkling operation only when the water becomes short, it is very efficient and can adjust even the water-sprinkling frequency by changing the condition and sensitivity of the moisture sensor. The controller can have its power consumption so reduced as to make it unnecessary to replace the dry cell for a long time period and as to enjoy sufficient safety. Moreover the controller is nabled to achieve its normal operations at all times by the self-cleaning effect by the small spray nozzle of the controller. Thus, the present invention can have remarkably excellent effects upon watering of lawn, moss, plants, and so on.

NAME OF PARTS IN DRAWINGS a; a faucet.
b; a main-valve.
c; a main hose.
d; a pilot tube.
e; a sprinkler.
f; a controller.
g; a moisture sensor unit.
h; a microvalve unit.
1; an attachment port.
2; an inlet port.
3; output port.
4; diaphragm.
5; valve seat.
6; a small hole.
7; a back chamber.
8; a pilot connecting port.
9; a main connecting port.
10; vents.
11; a cover box.
12; a nylon ribbon.
13; a roll
14; a microswitch.
15; an actuator.
16; a sensitivity adjusting knob.
17; a small spray nozzle.
18; a microvalve.
19; a latching relay.
20; an inlet port.
21; an outlet port.
22; an intermeditate passage.
23; a plunger.
24; an O-ring.
25; a U-packing.
26; a spring.
27; an actuating lever.
28; a permanent magnet.
29; pores.
30; a pointed end.
31; an absorptive material.
s; an electronic circuit.
r; a latching solenoid.
t; a timer circuit.
u; a limit switch.

What is claimed is:

1. An automatic water sprinkling system for sprinkling an area of ground, which comprises:
   a main valve adapted to be connected to a supply of water and hydraulically controllable to allow water to selectively flow therethrough to a sprinkler;
   a microvalve hydraulically coupled to the main valve, the microvalve being operable in a first state for a selectable period of time to hydraulically control the main valve to allow water to flow through the main valve, the microvalve being responsive to a microvalve control signal;
   means for sensing moisture, the moisture sensing means being in an activating condition when the sensed moisture is less than a predetermined value, the moisture sensing means comprising an elongated strip of moisture sensitive material disposed within a cover box having a first vented portion above the ground and a second porous portion in the ground, the second porous portion being filled with a water-absorptive material;
   switch means operatively coupld to the moisture sensing means and responsive to the activating condition thereof, the switch means providing a timing means actuating signal;
   timing means for controlling the duration that the microvalve is in said first state, the timing means being responsive to the timing means actuating signal and providing a microvalve control signal; and
   means for wetting the moisture sensitive strip of the sensing means, the wetting means being operatively coupled to the microvalve, wherein said moisture sensing means senses when the moisture is below the predetermined value and activates said switch means, said switch mans providing said actuating signal to the timing means to activate the timing means, whereupon said timing means provides said control signal to said microvalve to activate said microvalve for a predetermined period of time.

2. An automatic water-sprinkling system according to claim 1, wherein said moisture sensitive strip of the moisture sensing means expands with a water spray provided from said wetting means.

3. An automatic water sprinkling system as defined by claim 1, wherein the microvalve includes a latching solenoid, biasing means operatively coupled to the latching solenoid, and a latching relay, the latching relay being electrically connected to the latching solenoid to actuate the same.

* * * * *